(12) United States Patent
Hurst

(10) Patent No.: US 11,155,287 B2
(45) Date of Patent: Oct. 26, 2021

(54) VEHICLE EMULATOR SYSTEM

(71) Applicant: Westinghouse Air Brake Technologies Corporation, Wilmerding, PA (US)

(72) Inventor: Ryan Paul Hurst, Lee's Summit, MO (US)

(73) Assignee: Westinghouse Air Brake Technologies Corporation, Wilmerding, PA (US)

(*) Notice: Subject to any disclaimer, the term of this patent is extended or adjusted under 35 U.S.C. 154(b) by 59 days.

(21) Appl. No.: 16/803,530

(22) Filed: Feb. 27, 2020

(65) Prior Publication Data

US 2020/0189635 A1 Jun. 18, 2020

Related U.S. Application Data

(63) Continuation-in-part of application No. 15/277,275, filed on Sep. 27, 2016, now abandoned.

(60) Provisional application No. 62/236,556, filed on Oct. 2, 2015.

(51) Int. Cl.
*B61L 27/00* (2006.01)
*G09B 9/052* (2006.01)

(52) U.S. Cl.
CPC .......... *B61L 27/0055* (2013.01); *G09B 9/052* (2013.01)

(58) Field of Classification Search
CPC ............. B61L 27/0038; B61L 27/0055; B61L 25/025; B61L 2201/00; G09B 9/04
See application file for complete search history.

(56) References Cited

U.S. PATENT DOCUMENTS

| | | | |
|---|---|---|---|
| 6,298,318 B1 * | 10/2001 | Lin | G01C 21/16 434/2 |
| 8,457,817 B2 * | 6/2013 | Hawthorne | B61L 15/0081 701/20 |
| 9,014,884 B2 * | 4/2015 | Pritchard | B61L 3/006 701/19 |

* cited by examiner

*Primary Examiner* — Timothy A Musselman
(74) *Attorney, Agent, or Firm* — Christopher R. Carroll

(57) ABSTRACT

A vehicle control signal generator includes emulation circuitry for emulating at least one operation of at least one vehicle control circuit. The emulation circuitry is programmed or configured to determine or receive user input and based at least partially on the user input, generate at least one control signal for controlling at least one of the following onboard vehicle subsystems: a propulsion system, a train line control system, an air brake system, a dynamic braking system, a head of train (HOT) system, an end of train telemetry (EOT) system, a 4-Aspect cab signaling system, a positive train control (PTC) system, an event recorder system, or any combination thereof.

20 Claims, 7 Drawing Sheets

VEHICLE EMULATOR SYSTEM

CROSS-REFERENCE TO RELATED APPLICATIONS

This application is a continuation-in-part of U.S. patent application Ser. No. 15/277,275, filed on 27 Sep. 2016, which claims the benefit of priority from U.S. Provisional Patent Application No. 62/236,556, filed on 2 Oct. 2015. The entire disclosures of these applications are incorporated herein by reference.

BACKGROUND

Technical Field

Disclosed embodiments relate generally to vehicle control signal generation, and in particular to a vehicle control signal generator and method that provides emulation of a vehicle control circuit, such as in connection with vehicle training and vehicle testing.

Description of Art

Vehicle operators and repair personnel typically receive some type of training on how vehicle function and operate. Theoretical training on the function and operation of vehicles can provide only a limited level of knowledge transfer to a student. Practical training on an actual vehicle can provide a more advanced level of knowledge transfer and/or more hands-on experience to the student, but has disadvantages of increased safety and cost risks.

Vehicle simulators have been created in an attempt to provide operators with more practical training without incurring the safety and cost risks associated with training on an actual vehicle. However, conventional vehicle simulators are directed primarily at the vehicle operator and do not deliver physical signals to actual onboard vehicle hardware and subsystems. Conventional vehicle simulators instead focus more on the route layout and operator interaction regarding controlling a vehicle system during simulated operations. Consequently, conventional vehicle simulators are not suitable for training mechanical repair personnel or for performing vehicle hardware and subsystems testing. For example, with respect to rail vehicles, conventional vehicle simulators cannot provide an indication of how a positive train control (PTC) system and an event recorder system behave on an actual operational vehicle during revenue service.

Furthermore, some conventional hardware racks for testing vehicle hardware can only test individual vehicle control circuits one at a time. Conventional hardware racks cannot test a combination of circuits that can be actuated together, such as during operation of an actual vehicle in revenue service. This can cause a defect to go undetected during a test and, thus, the vehicle hardware not receiving proper repair.

BRIEF SUMMARY

Generally, provided are an improved vehicle control signal generator and computer-implemented method for emulating at least one operation of at least one vehicle control circuit. Preferably, provided are a vehicle control signal generator and computer-implemented method that enable various hardware and systems that monitor vehicle control system signals to be placed in normal vehicle operation without an actual vehicle being required. Preferably, provided are a vehicle control signal generator and computer-implemented method that provide onboard vehicle hardware and subsystems, such as PTC and event recorder systems, vehicle control system signals that can be generated in a controlled environment. A vehicle control signal generator and computer-implemented method are provided that reduce safety risks and cost risks associated with training personnel on the functions and operations of vehicles. The vehicle control signal generator and computer-implemented method can omit or modify vehicle logic during operation with regard to any and all signal output drive logic to simulate vehicle failures, which can greatly enhance training by enabling users to troubleshoot the system in which they are receiving training. The vehicle control signal generator and computer-implemented method can enable a user to replicate conditions that were present on a vehicle at a time of failure, which allows confirmation of defects to ensure proper diagnosis of problems so that causes of the problem can be addressed and documented.

In one embodiment, a vehicle control signal generator includes emulation circuitry for emulating at least one operation of at least one vehicle control circuit. The emulation circuitry is programmed or configured to determine or receive user input and, based at least partially on the user input, generate at least one control signal for controlling at least one of the following onboard vehicle subsystems: a propulsion system, a vehicle line (e.g., train line) control system, an air brake system, a dynamic braking system, a head of train (HOT) system, a telemetry system, and end-of-train (EOT) telemetry system, a 4-Aspect cab signaling system, a PTC system, an event recorder system, or any combination thereof.

The control signal that is output by the emulation circuitry can be the same as (e.g., identical to) the control signal that would be sent to components of the vehicle system to actually move (e.g., not just emulate movement) the vehicle system. For example, the control signal output by the emulation circuitry could be provided to the propulsion system of the vehicle system and cause the propulsion system to move or change movement of the vehicle system. As another example, the control signal output by the emulation circuitry could be provided to the braking system of the vehicle system and cause the braking system to engage or release the braking system of the vehicle system. During emulation of the vehicle system, however, the control signals are output by the emulation circuitry but not provided to the propulsion system or braking system. This prevents the propulsion system and braking system from actually operating. Instead, the control signals may be output to other monitoring components, such as sensors, PTC systems, or the like, to monitor how the vehicle system would move if the control signals were used to actually control movement of the vehicle system. The control signals generated during emulated operation of the vehicle system may be identical to the control signals generated during actual, moving operation of the vehicle system such that the monitoring systems (e.g., the PTC system) is unable to distinguish between the control signals generated during emulated vehicle operation and the control signals generated during actual movement of the vehicle system.

The PTC system is one example of a positive vehicle control (PVC) system. A PVC is a control system in which a vehicle system is allowed to move, and/or is allowed to move outside a designated restricted manner (such as above a designated penalty speed limit), only responsive to receipt or continued receipt of one or more signals (e.g., received from off-board the vehicle) that meet designated criteria, e.g., the signals have designated characteristics (e.g., a designated waveform and/or content) and/or are received at designated times (or according to other designated time criteria) and/or under designated conditions. This is opposed to 'negative' vehicle control systems where a vehicle is allowed to move unless a signal (restricting movement) is received.

In one embodiment, the emulation circuitry is programmed or configured to determine or receive at least one output signal from the at least one onboard vehicle subsystem. Optionally, the emulation circuitry is programmed or configured to generate the at least one control signal based at least partially on the at least one output signal. Optionally, the at least one output signal comprises data representing an event recorder file. Optionally, the emulation circuitry is programmed or configured to replicate conditions present in one or more vehicle control circuits of a vehicle at a selected period of time based at least partially on the data representing the event recorder file. In another example, the conditions include at least one error or failure condition of the one or more vehicle control circuits of the vehicle. Optionally, the at least one output signal comprises data representing a route database file. In another example, the emulation circuitry is programmed or configured to generate the at least one control signal in a National Marine Electronics Association (NMEA) format based at least partially on the data representing the route database file.

Optionally, the emulation circuitry is programmed or configured to generate the at least one control signal as one of a digital signal, an analog signal, a frequency signal, and a serial communications signal.

Optionally, the emulation circuitry is programmed or configured to modify the emulation of the at least one operation of the at least one vehicle control circuit to simulate at least one failure of the vehicle control circuit.

Optionally, the emulation circuitry simultaneously emulates operations of a plurality of vehicle control circuits, and the emulation circuitry is programmed or configured to generate a plurality of control signals for controlling a plurality of onboard vehicle subsystems.

In another example, the emulation circuitry is programmed or configured to provide a user interface configured to determine or receive the user input and provide an output of vehicle operational information. Optionally, the user interface comprises at least one emulated vehicle control configured to be actuated by a user. In another example, the at least one emulated vehicle control comprises at least one of the following: a master controller reverser position control, a master controller throttle position control, an automatic brake control, an independent brake control, a feed valve settings control, an air brake cut in and cut out actuation control, an engine control switch, a cab signal cut in and cut out switch, a cab signal depart test switch, a horn switch, a generator field switch, an engine run switch, a wheel slip test switch, a manual sand switch, an alerter reset switch, or any combination thereof. Optionally, the output of vehicle operational information comprises at least one of the following: at least one emulated air brake gauge indicating at least one of a main reservoir pressure, a brake pipe pressure, an equalizing reservoir pressure, and a brake cylinder pressure, an emulated load meter, an emulated 4 aspect cab signal display, an emulated head of train device with read out, an emulated speedometer, an emulated wheel slip indicator, an emulated process control system (PCS) open indicator, or any combination thereof.

In another example, the emulation circuitry comprises a processor configured to control a display to provide the user interface to the user and execute vehicle logic to emulate the at least one operation of the at least one vehicle control circuit and at least one programmable logic controller (PLC) configured to drive the at least one vehicle control subsystem with the at least one control signal based at least partially on the emulation of the at least one operation of the at least one vehicle control circuit.

Optionally, the at least one control signal comprises at least one of: i) movement data representing an emulated speed of the vehicle and/or an emulated acceleration of the vehicle and/or ii) location data representing an emulated location or position of the vehicle, an emulated location or position of a vehicle system including the vehicle, and/or an emulated location or position of at least one other vehicle of the vehicle system.

In one embodiment, the emulation circuitry is programmed or configured to emulate at least one operation of a vehicle control circuit of a propulsion-generating vehicle equipped with 26L type air brake system and a DC traction type propulsion system.

Optionally, the emulation circuitry is programmed or configured to emulate at least one operation of a vehicle control circuit of a propulsion-generating vehicle equipped with a Locomotive Systems Integration (LSI) protocol electronic air brake system and an AC traction type propulsion system.

In one example, the emulation circuitry is programmed or configured to emulate at least one operation of a vehicle control circuit of a propulsion-generating vehicle equipped with a communication gateway, such as a locomotive interface gateway (LIG).

Optionally, provided is a computer-implemented vehicle control signal generation method for emulating at least one operation of at least one vehicle control circuit. The method can include determining or receiving user input and, based at least partially on the user input, generating at least one control signal for controlling at least one of the following onboard vehicle subsystems: a propulsion system, a vehicle line control system, an air brake system, a dynamic braking system, a HOT system, a telemetry system, a 4-Aspect cab signaling system, a safety system, an event recorder system, or any combination thereof.

In one example, a non-transitory computer-readable medium including computer-executable instructions is provided. The instructions, when executed on one or more computers, emulate operation of at least one vehicle control circuit by determining or receiving user input and, based at least partially on the user input, generate at least one control signal for controlling a propulsion system, a vehicle line control system, an air brake system, a dynamic braking system, a HOT system, a telemetry system, a 4-Aspect cab signaling system, a safety system, and/or an event recorder system.

BRIEF DESCRIPTION OF THE DRAWINGS AND APPENDICES

DETAILED DESCRIPTION

Figure 1A:
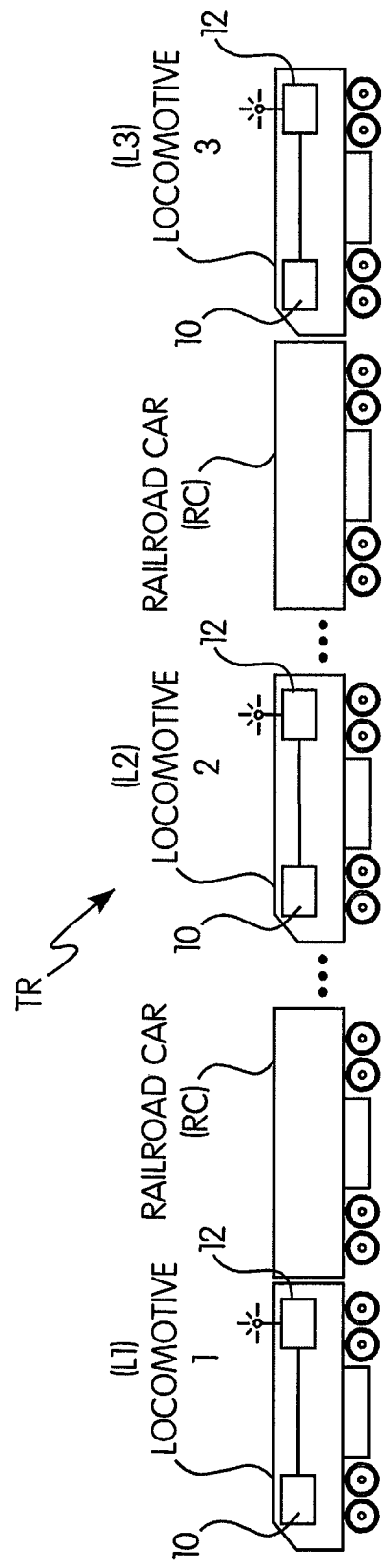
FIG. 1A is a schematic view of a vehicle control system that can be used in connection with a vehicle control signal generator.
Figure 1B:
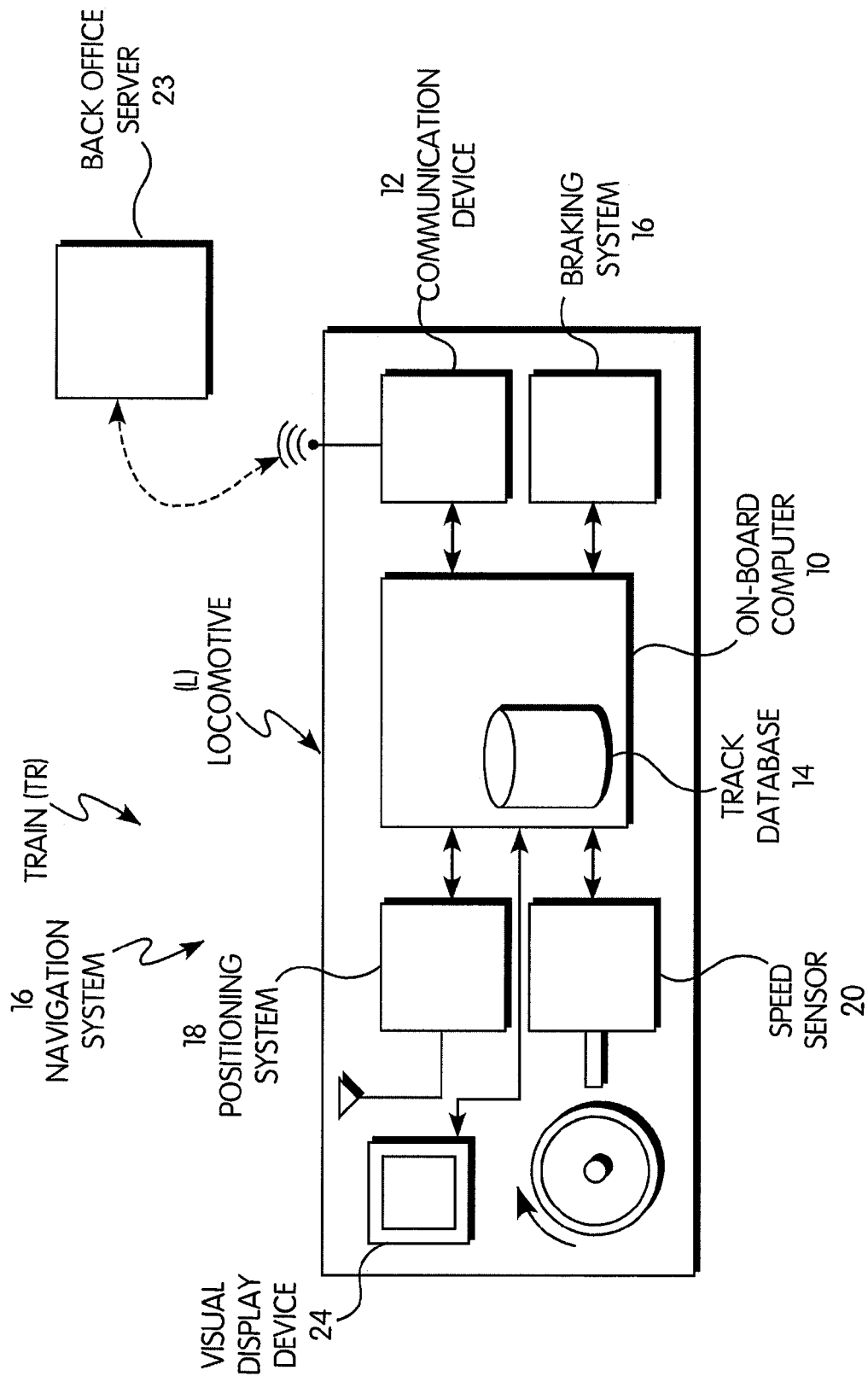
FIG. 1B is a schematic view of one embodiment of a vehicle control system that can be used in connection with a vehicle control signal generator.

FIGS. 1A and 1B illustrate a vehicle control signal generator and computer-implemented method. The generator and method may be implemented with respect to vehicle subsystems in a laboratory environment or on a vehicle system including at least one propulsion-generating vehicle or control car and, optionally, one or more non-propulsion-generating vehicles. While one or more embodiments are described herein in connection with rail vehicles (e.g., trains (TR), locomotives (L), and railcars (RC)), not all embodiments are limited to rail vehicles. One or more embodiments may be used with other types of vehicles, such as automobiles, mining vehicles, aircraft, marine vessels, agricultural vehicles, or the like. In one implementation, a vehicle system (e.g., a train (TR)) may include a plurality of propulsion-generating-vehicles (e.g., locomotives (L1, L2, L3)) and a plurality of non-propulsion-generating vehicles (e.g., rail cars (RC)). Optionally, the train (TR) may include only a single locomotive (L) and no rail cars (RC).

The propulsion-generating vehicle(s) (L) are equipped with at least an on-board computer 10 (e.g., an on-board controller, a train management computer, an on-board processor, and/or the like) programmed or configured to implement or facilitate at least one train action and a communication device 12 in communication with the on-board computer 10 and programmed or configured to receive, transmit, and/or process data signals. While the communication device 12 may be in the form of a wireless communication device (as illustrated in FIG. 1B), as discussed herein, this communication device 12 may also be programmed or configured to transmit, process, and/or receive signals over a trainline, using an ECP component, over the rails, and/or the like.

A control signal generator and computer-implemented method may be used in connection with and communicate (send and/or receive) control signals and/or vehicle system data to and/or from at least some of the following vehicle subsystems: the vehicle system management computer or on-board computer 10 (which performs calculations for or within the safety system, including navigation and enforcement calculations); the communication device 12 (or data radio) (which may be used to facilitate the communications between the on-board computers 10 in one or more of the propulsion-generating vehicles or control cars (L) of a vehicle system (TR), communications with a wayside device, e.g., signals, switch monitors, wayside devices, and the like, and/or communications with a remote server, e.g., a back office server 23, a central controller, central dispatch, and/or); a route database 14 (which may include information about route positions or locations, switch locations, crossing locations, route heading changes, e.g., curves, distance measurements, vehicle system information, e.g., the number of propulsion-generating vehicles or control cars (L), the number of non-propulsion-generating vehicles (RC), the number of conventional passenger vehicles, the number of control cars, the total length of the vehicle system (TR), the specific identification numbers of each propulsion-generating vehicle or control car (L) where safety system equipment (e.g., an on-board computer 10) is located, and the like); a navigation system 16 (optionally including a positioning system 18 (e.g., a Global Positioning System (GPS)) and/or a wheel tachometer/speed sensor 20), such as in a PTC-equipped propulsion-generating vehicle or control car (L); and a visual display device 24 (or operator interface), typically located in the propulsion-generating vehicle or control car (L), which is in direct or indirect communication with the on-board computer 10 and provides information and data to the operator, such as the information, data, and/or screens as discussed hereinafter. It should also be recognized that some or all of the steps and processing described herein may be performed locally by the on-board computer 10 of the propulsion-generating vehicle or control car (L), or alternatively, by another computer (e.g., a computer associated with the end-of-train unit, a computer associated with a wayside device, and the like) and/or a remote computer or server (e.g., the back office server 23, a remote computer or server associated with central dispatch, a central controller, a computer-aided dispatch system, and intermediate control computer, and the like).

Further, and as discussed, the on-board computer 10 includes or is in communication with the communication device 12 (e.g., a data radio, a communication interface, a communication component, and/or the like), which facilitates communication by or between propulsion-generating vehicles or control cars (L) and/or the propulsion-generating vehicle or control car (L) and some remote server or computer system, e.g., a central controller, a back office server 23, a remote server, central dispatch, back office components that interact with the safety system, various wayside devices, such as signal or switch monitors, or other on-board computers 10 in the railway system. Further, this communication may occur wirelessly or in a "hard wired" form, e.g., over the rails of the route.

As discussed, the on-board computer 10 may be located at any position or orientation on the vehicle system (TR), and the on-board computer 10 (or on-board controller, on-board computer system, vehicle system management computer, and/or the like, and which performs the determinations and/or calculations for the safety system) includes or is in communication with the route database 14 populated with data and/or which receives specified data and information from other vehicle systems, remote servers, back office servers 23, central dispatch, and/or the like, where this data may include route profile data, vehicle system data, information about switch locations, route heading changes (e.g., curves, and distance measurements), vehicle system consist information (e.g., the number of propulsion-generating vehicles, the number of cars, the total length of the vehicle system (TR)), and/or the like. Of course, it is envisioned that any type of vehicle system management system can be used within the context and scope of the inventive subject matter.

Figure 1C:
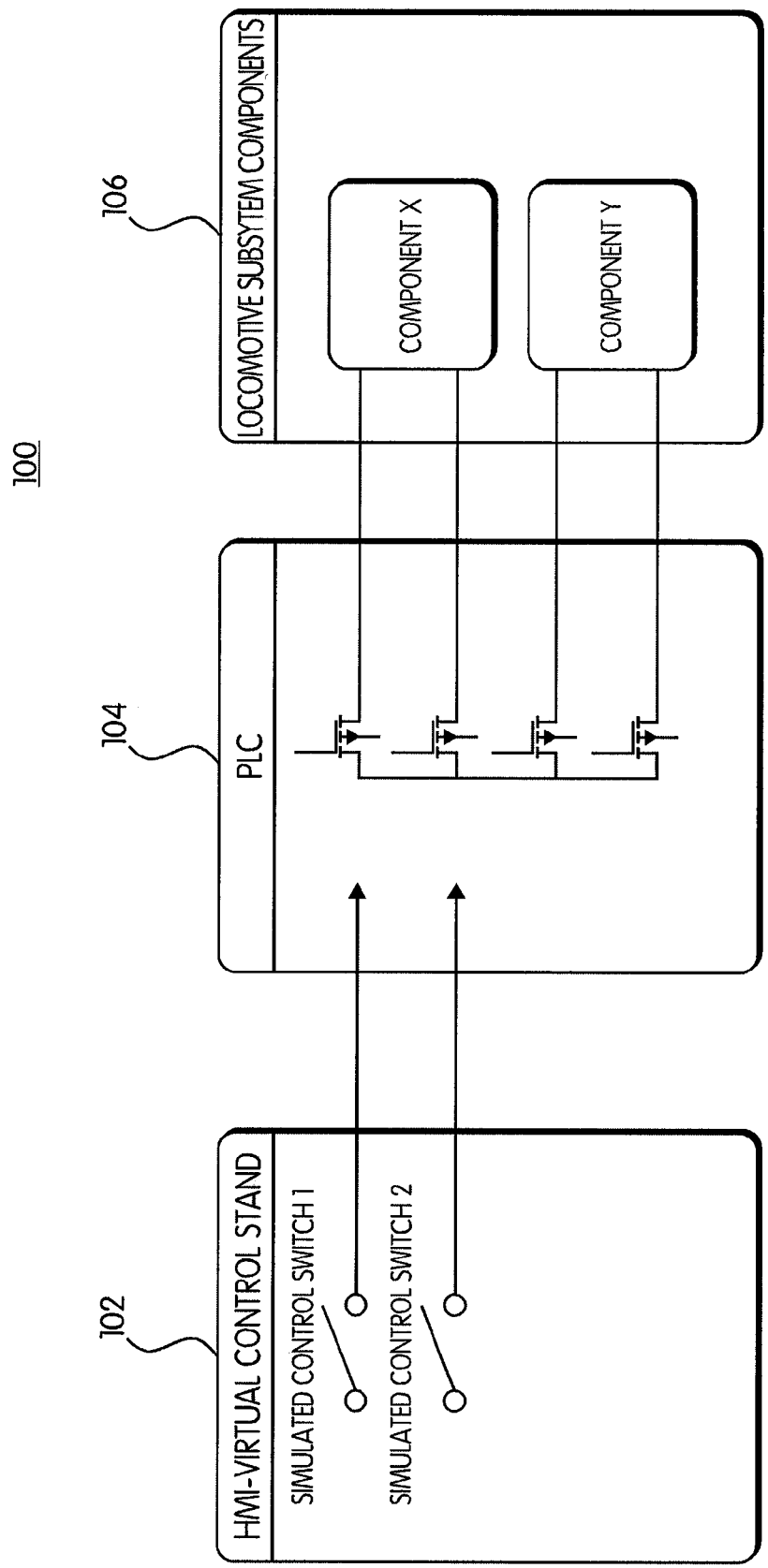
FIG. 1C is a schematic drawing of a vehicle control signal generator.

In one example, and as illustrated in FIG. 1C, the system architecture used to support the functionality of at least some of the methods and systems described herein includes a vehicle control signal generator (LCSG) 100 that includes a human-machine interface (HMI) 102, a programmable logic controller (PLC) layer (104), and a vehicle subsystem components layer 106.

Figure 2:
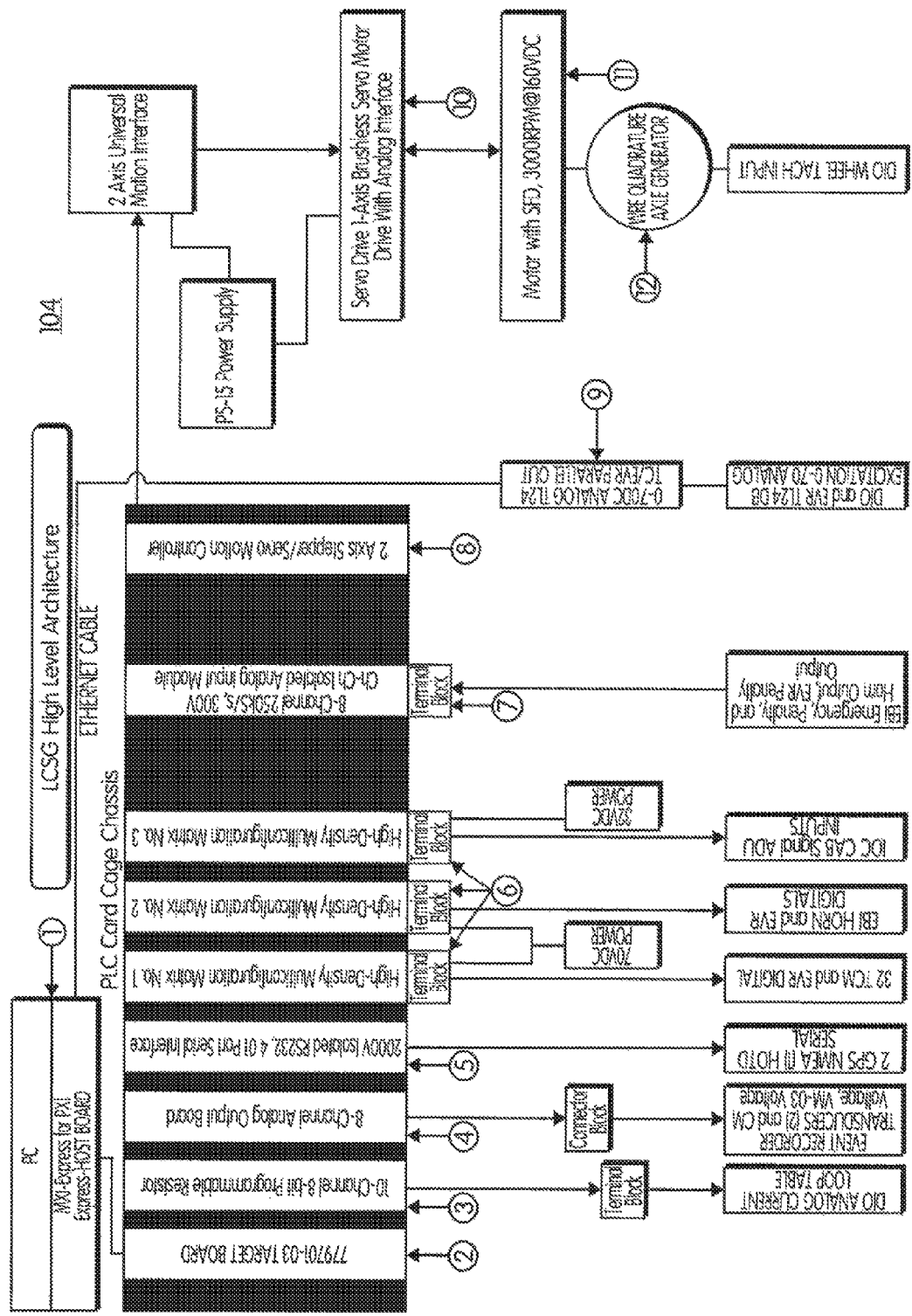
FIG. 2 is a schematic drawing of one embodiment of a vehicle control signal generator including a programmable logic controller layer.

FIG. 2 is a schematic drawing showing details of the PLC layer 104 of the LCSG 100. A personal computer (PC) 1 can store and execute software for controlling the HMI 102 and emulating vehicle control circuits, and includes an express PC Host board that communicates with a PLC card cage chassis including a plurality of programmable logic controllers (PLCs). For example, the PC 1 and the PLCs can provide emulation circuitry programmed or configured to emulate vehicle control circuits. The PC 1 can execute the software based on vehicle logic to emulate the vehicle control circuits based on user input received from the HMI 102 and output signals received from the onboard vehicle hardware and subsystems, and control the PLCs to generate control signals to drive the onboard vehicle hardware and subsystems.

Figure 3:
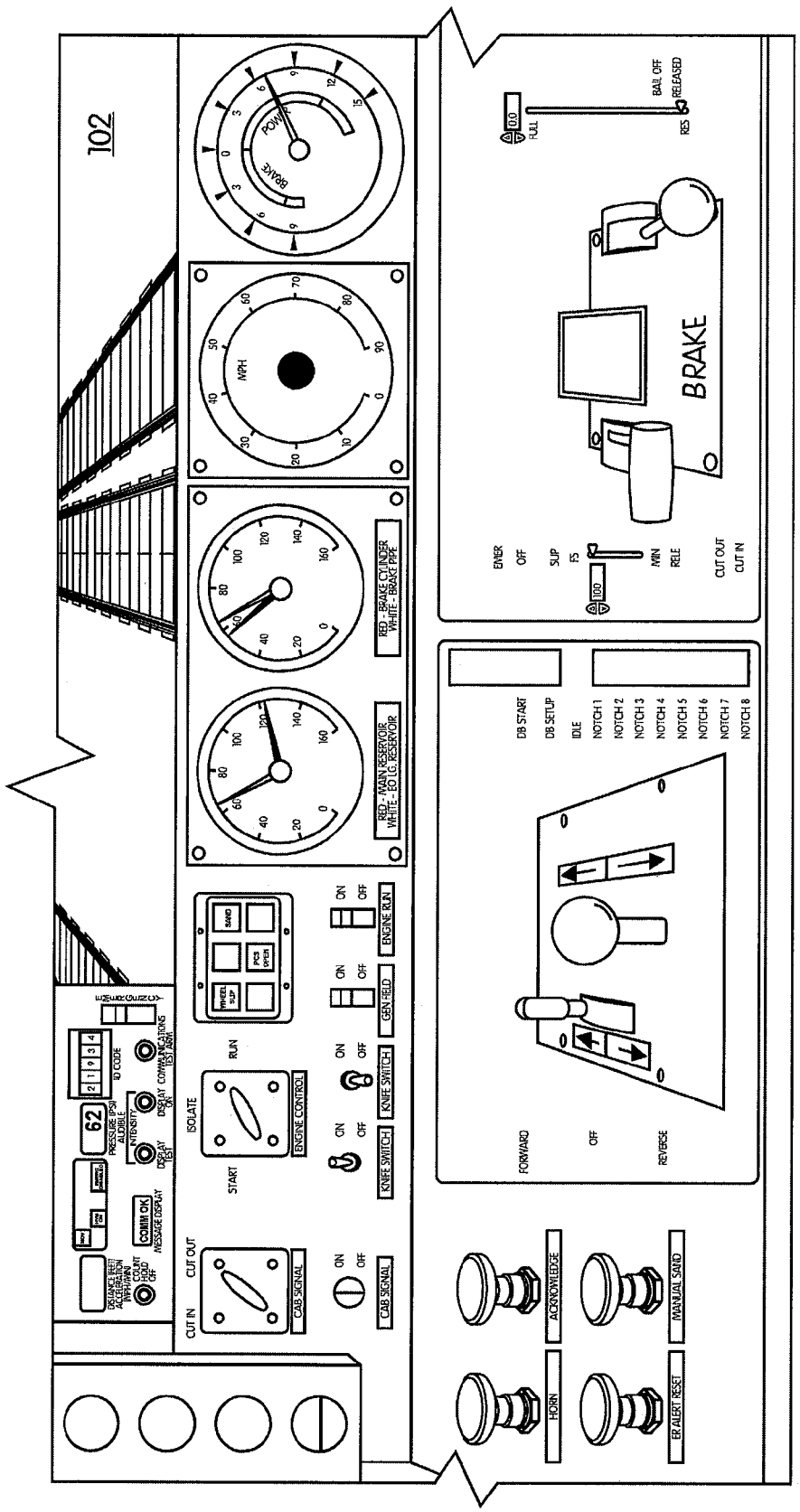
FIG. 3 is a perspective view of an example user interface.

The HMI 102 comprises a user interface configured to determine or receive user input from a user and provide an output of vehicle operational information. For example, the emulation circuitry, such as the PC 1 and/or one or more physical vehicle controls, is programmed or configured to provide the user interface to determine or receive the user input from the user. The user interface comprises at least one emulated vehicle control configured to be actuated by a user. For example, the at least one emulated vehicle control comprises at least one of the following: a master controller reverser position control, a master controller throttle position control, an automatic brake control, an independent brake control, a feed valve settings control, an air brake cut in and cut out actuation control, an engine control switch, a cab signal cut in and cut out switch, a cab signal depart test switch, a horn switch, a generator field switch, an engine run switch, a wheel slip test switch, a manual sand switch, and/or an alerter reset switch. As described in more detail herein, the emulated vehicle controls can comprise software based touchscreen interfaces and/or physical vehicle controls designed to simulate an actual vehicle cab environment, such as a physical mechanical throttle handle. FIG. 3 illustrates various example vehicle controls provided by physical switches or levers and other controls provided via a graphical user interface (GUI) on a display.

The HMI 102 can enable the user to interface with a simulated vehicle control stand via the PC 1 in a manner consistent with that of a vehicle operator interfacing with an actual vehicle operating in revenue service. For example, the HMI 102 can include a supplemental control window that displays percentages and positions of the above-noted controls to the user as feedback to actual percentages and positions selected by the user. In another embodiment or aspect, the HMI 102 can include in the supplemental control window up and down arrows to "bump" one or more of the controls for more finite movement thereof, e.g., for more finite movement of a master controller throttle handle, a master controller reverse handle, an independent brake handle (e.g., in 5% increments), and an automatic brake handle (e.g., detent positions/5% increments).

Figure 4:
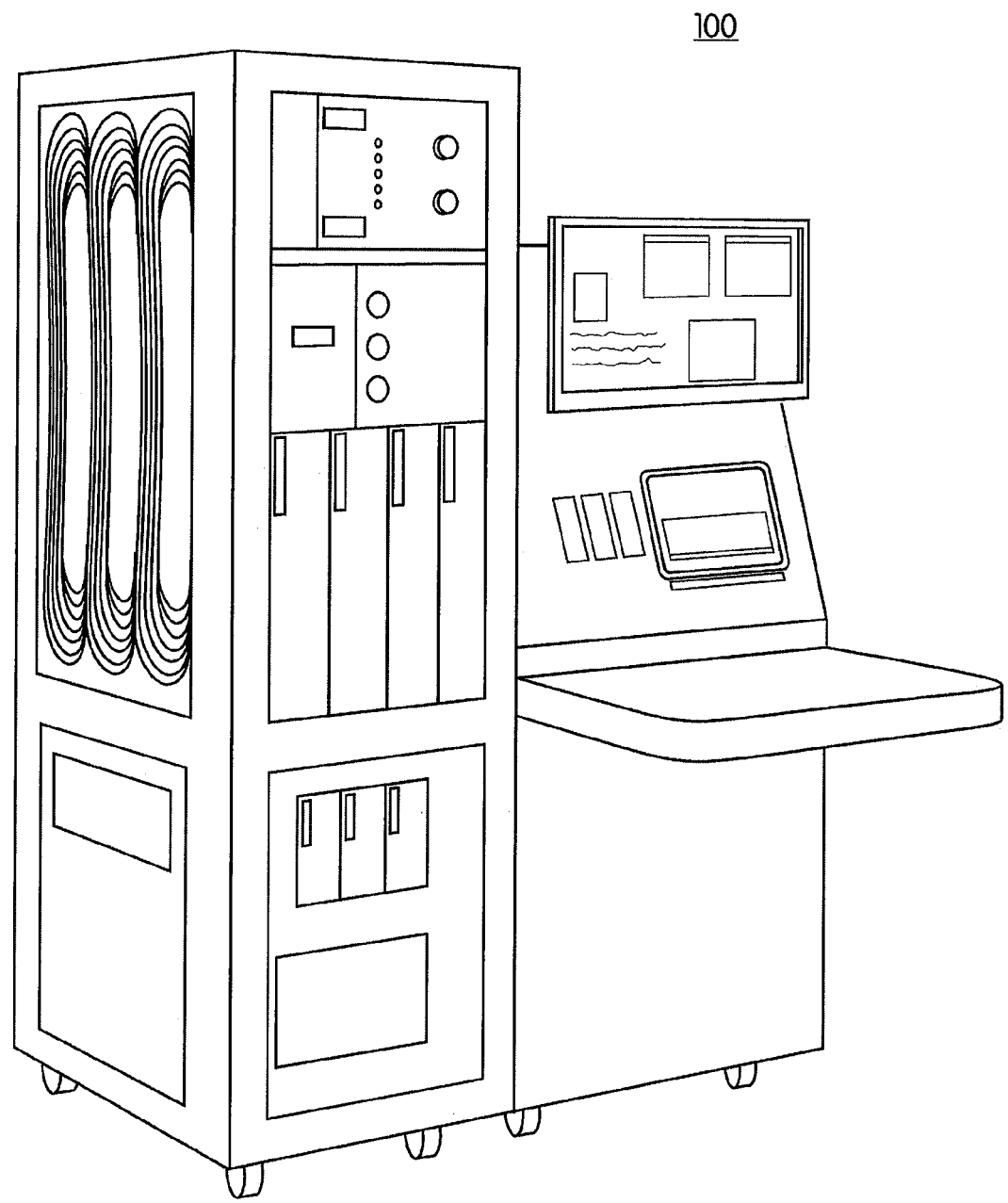
FIG. 4 is a perspective view of a vehicle control signal generator.

In one preferred and non-limiting embodiment or aspect, at least a portion of the HMI 102 is provided as a user interface via a display, e.g., a typical desktop monitor or touchscreen interface. The display can include any vehicle control and may be situated similar to a freight vehicle operators cab. In another example, at least a portion of the vehicle controls are mechanically or electromechanically provided, e.g., a throttle lever, and when mechanically or electromechanically actuated by the user cause the HMI 102 to receive or determine the user input via the mechanical or electromechanical actuation. For example, the HMI 102 is programmed or configured to resemble a typical vehicle control stand, such as the embodiment shown in FIG. 3, with some vehicle control provided by physical switches or levers and other controls provided via a GUI on a display. FIG. 4 is a perspective view of one preferred and non-limiting embodiment or aspect of a vehicle control signal generator.

A user can actuate the vehicle controls in the HMI 102 to provide the user input, and the PLC layer 104 can drive physical outputs or control signals that can be monitored by many different types of onboard vehicle hardware and subsystems in response to the user input. For example, the PLC layer 104 can respond based on the logic of the combination of actuated controls to emulate the functions and/or operations an actual vehicle control system performs in response to the combination of controls. In an example, the onboard vehicle hardware and subsystems can include an onboard safety system (e.g., PTC system), a safety system crash hardened memory module, an actual automatic engine restart system, a cab signal system, a diesel engine control system, and a vehicle event recorder. However, example embodiments are not limited thereto and the LCSG 100 can be configured to send signals to any onboard vehicle hardware or subsystem.

The HMI 102 can command system output and deliver vehicle operational information to the user, such as indicator lights, meter readings, and audible warnings. In an example, the output of vehicle operational information provided to the user via the HMI 102, which is determined by the emulation circuitry of the PLC layer 104 based on the user input, the control signals sent to the onboard vehicle hardware and subsystems, and the output signals received from the onboard vehicle hardware and subsystems, can include at least one of the following: at least one emulated air brake gauge indicating at least one of a main reservoir pressure, a brake pipe pressure, an equalizing reservoir pressure, and a brake cylinder pressure, an emulated load meter, an emulated 4-aspect cab signal display, an emulated head of vehicle system device with read out, an emulated speedometer, an emulated wheel slip indicator, and/or an emulated process control system (PCS) open indicator. For example, the output of vehicle operational information determined by the emulation circuitry and provided to the user via the HMI 102 can correspond to a response to the user input, the control signals, and the output signals that would be provided by an actual vehicle in revenue service.

In one example, the PLC layer 104 can output control signals based on input provided by the user. These control signals can be used to control operation of one or more controlled components, such as the braking system 16, one or more traction motors, or the like. Because the system is emulating control of the vehicle system, the PLC layer 104 can output the control signals without the control signals actually engaging the braking system 16, without activating or changing speed or torque of a traction motor, or the like. But, the control signals can be output to one or more monitoring components of the vehicle system so that these components can monitor emulated operation of the vehicle system. The monitoring components can represent computerized systems that monitor operation of the vehicle system and limit or restrict operation of the vehicle system based on one or more monitored characteristics of operation of the vehicle system. These monitoring components also can receive the control signals output by the PLC layer 104 to determine how the vehicle system is being controlled to operate (in the emulated environment).

For example, the PLC layer 104 can output the control signals based on operator input to the monitoring components. The monitoring components can examine the control signals to determine how the vehicle system is operating or being directed to operate. The monitoring components can determine how fast the motors are directed to operate, how the braking system 16 is being released or engaged, or the like. Optionally, the monitoring components may not receive the control signals but may monitor the output of other components that are controlled by the control signals. The monitoring components can include the safety system, such as the onboard computer 10 operating as the PTC system, monitoring operation of the propulsion system, braking system, or the like, that is directed by the control signals.

As one example, the PTC system can determine the emulated location of the vehicle system and determine whether the vehicle system can enter into an upcoming segment of a route that the emulated movement of the vehicle system has the vehicle system moving toward. The PTC system may determine that the vehicle system cannot enter into the route segment (e.g., due to another emulated or actual vehicle system being located on the route segment). Based on the directed control of the braking system and/or traction motors from the control signals that are output by the PLC layer 104, however, the PTC system may determine that the operator is attempting to release the braking system and/or control the propulsion system to move the vehicle system into the route segment. The PTC system may then communicate an output signal to the HMI to notify the operator that the control of the vehicle system by the operator is not permitted.

As another example, the PTC system can determine the emulated location of the vehicle system and determine how fast the vehicle system is allowed to move (e.g., to be able to brake and stop before entering into an upcoming route segment). Based on the directed control of the braking system and/or traction motors from the control signals that are output by the PLC layer 104, however, the PTC system may determine that the operator is attempting to move the vehicle system faster than allowed. The PTC system may then communicate an output signal to the HMI to notify the operator that the control of the vehicle system by the operator is not permitted.

As discussed above, the software and hardware providing the HMI 102 and the vehicle logic that determines the associated driven output sequence and/or control signal values can be housed in the PC 1. For example, the emulation circuitry comprises one or more processors programmed or configured to control a display to provide the user interface to the user and execute vehicle logic to emulate the operations of vehicle control circuits and at least one PLC programmed or configured to drive onboard vehicle hardware and subsystems with control signals based on the emulation of the operations of the onboard vehicle control circuits. The PC 1 can receive the user input from the user via the HMI 102 and translate the combination of control lever and switch positions to a combination of vehicle control output electrical signals. Commands with the corresponding signal to drive are sent from the PC 1, to individual PLC cards in the PLC card cage chassis as shown in FIG. 2. For example, there are a wide variety of signal types, and one or more PLC cards can be assigned for each signal type. The PLC layer 104 monitors output signals from the applied onboard vehicle hardware and subsystem output controls and reacts based on known vehicle control system response logic, which can cause the PLC layer 104 to modify its own output circuits.

The PLC layer 104 can generate, based on the user input, the control signals, and/or the output signals at least one control signal for controlling at least one of the following onboard vehicle subsystems: a propulsion system, a vehicle system line control system, an air brake system, a dynamic braking system, a HOT system, an EOT system, a 4-Aspect cab signaling system, a safety system, and/or an event recorder system. For example, the PLC layer 104 can comprise hardware, such as the PC 1 and the PLC cards, that translates the user input into electrical and physical outputs. For example, the emulation circuitry of the PLC layer 104 can be programmed or configured to generate the at least one control signal as one of a digital signal, an analog signal, a frequency signal, and a serial communications signal. The PLC layer 104 can deliver the control signals to the onboard vehicle hardware and subsystem components layer 106 in the same logic that a vehicle would deliver control signals during revenue service to provide an emulated vehicle environment. In some embodiments, the emulation circuitry simultaneously or concurrently emulates operations of a plurality of different vehicle control circuits, and the emulation circuitry is programmed or configured to generate a plurality of different control signals for controlling a plurality of different onboard vehicle hardware and subsystems.

Referring again to FIG. 2, the system architecture used to support the functionality of at least some of the methods and systems described herein includes a target board 2 in the PLC card cage chassis can be configured to translate and route messages bound to each card within the PLC card cage chassis. For example, the target board 2 can translate messages from the PC 1 emulating the operations and outputs of various vehicle control circuits described herein into the appropriate format(s) for controlling the PLCs to generate the control signals to drive the onboard vehicle hardware and subsystems, and route the messages to the appropriate PLC(s) configured to drive the onboard vehicle hardware and/or subsystems according to the emulated operations and outputs. A programmable resistor board 3 can be configured to execute varying resistance values of various analog current loop circuits that are monitored by onboard vehicle hardware and subsystems, such as a safety system.

For example, the individual channels of the programmable resistor board 3 can be varied to emulate various vehicle system pressures, which are monitored by the by onboard vehicle hardware and subsystems, such as the safety system. In one embodiment, the programmable resistor board 3 is configured to use a 10-Channel 8-bit programmable resistor to execute varying resistance values of a digital input output (DIO) analog current loop table. An analog output board 4 is programmed or configured to deliver analog voltage values to various sensors as part of the onboard vehicle hardware and subsystems, such as the safety system and event recorder systems. For example, the analog voltage values can be varied to emulate transducers connected to various air brake pneumatic circuits that deliver input values to voltage and current sensors monitored by the safety system using event recorder transducers and a current module (CM), which can be a sensor that monitors current passing through a single traction motor circuit as part of the vehicle propulsion system.

The analog output board 4 controls the output to emulate the varying amount of current that the vehicle is producing for tractive effort based on operator selected input. In one embodiment, the analog output board 4 comprises an 8 channel analog output board. A RS-232 serial interface card 5 sends serial data to the onboard vehicle hardware and subsystems, such as the safety and event recorder systems. For example, the safety system can receive duplicate National Marine Electronics Association (NMEA) standardized GPS serial messages to emulate a GPS receiver sending time, speed, and position data to emulate vehicle movement.

The event recorder can receive emulated head-of-train device (HOTD) serial messages from the event recorder and safety system from the serial interface card 5. In one embodiment, the RS-232 serial interface card 5 comprises a 2000V Isolated RS232, 4 01 Port Serial Interface. 100701 A plurality of multi-configuration matrix boards 6 are configured to deliver digital signals to the onboard vehicle hardware and subsystems, such as the safety and event recorder systems, in corresponding vehicle logic as actuated by the user via the HMI 102. For example, a first multi-configuration matrix board can output 32 TMC and an EVR digital signals, for example forward and reverse signals, which can be digital 70V DC outputs that are driven based on user HMI control actuation bound for the safety and event recorder systems.

The user HMI control can include any combination of throttle handle, reverser handle, and individual switch activation received via the HMI 102. A second multi-configuration matrix board can output EBI HORN and EVR digital signals, which can be digital 70V DC outputs that are driven based on user HMI control selection bound for the event recorder. The EBI Horn and EVR digital signals can be attributed to air brake pressure switch actuation and passenger transit car monitoring applicators, and can include a lead/trail signal, a train separation signal, an actuating pipe signal, an EIE signal, an ER equalizing reservoir switch signal, an ER BC switch signal, an ER zero speed bypass signal, and an ER OS MAG valve signal. A third multi-configuration matrix board can output a 32V DC CAB signal IOC, which can be a 32V DC matrix board utilized to emulate aspect indications of a cab signal system. For example, the 32V DC CAB signal can represent the cab signal ADU lights in the HMI 102 and include signals, such as CCS Restricting+, CCS Advance Approach+, CCS Approach+, CCS Clear+. An analog input board 7 is programmed or configured to monitor output signals of the onboard vehicle hardware and subsystems, such as the safety and event recorder/Vigilance systems, so that the LCSG 100 can respond to commands, such as braking commands, from said systems. For example, the analog input board 7 can receive an EBI emergency signal, a penalty signal, a Horn output signal, and an EVR Penalty output signal. These signals are output control circuits from the safety and event recorder systems. The PLC/Software monitors these outputs and responds to their commands to alter the outputs of the PLC/Software. The safety penalty magnet valve tells the PLC/Software to modify braking and propulsions system values based on this input. The Emergency Magnet Valve tells the PLC/Software to modify braking and propulsions system values based on this input. The Horn Magnet Valve tells the PLC/Software to play horn sound upon input activation. The event recorder Penalty Magnet Valve tells the PLC/Software to modify braking and propulsions system values based on this input. In one embodiment, the analog input board 7 can comprise an 8-Channel, 250 kS/s, 300V Ch-Ch Isolated Analog Input Module. In some example, a PLC digital input/output board (not shown) may be programmed or configured to deliver frequency output signals to the onboard vehicle hardware and subsystems, such as the safety and event recorder systems; however these features may be incorporated in the axis server motor controller 8 discussed herein. An analog parallel output 9 can include an Ethernet connected programmable power supply that produces 0-70V DC analog values based on HMI handle position to the safety and event recorder systems. An axis servo motor controller 8 is programmed or configured to control the output of a servo motor drive 10, which in turn drives a servo motor 11 that rotates a vehicle axle generator 12 to deliver speed information to the onboard vehicle hardware and subsystems, such as the PTC and event recorder systems, in the form of an active quadrature frequency output.

The onboard vehicle hardware and subsystem components layer 106 is programmed or configured to receive the control signals from the PLC layer 104. The onboard vehicle hardware and subsystem components are programmed or configured to function and operate in the same manner as the components function and operate when implemented on an actual vehicle when the logic delivery from the HMI 102 and the PLC layer 104 are representative of a fully functioning vehicle. The LCSG 100 can drive one or more of the following outputs in response to the user input via the HMI 102 and the output signals from the onboard vehicle hardware and subsystems: Forward, Reverse, Engine Run, Gen Field, Throttle A, Throttle B, Throttle C, Throttle D, DB Set UP, DB Start, PCS, Knife Switch, EC Run, EC Isolate, Wheel Slip, Sand, AB Cutin/out, TM Current, Main Gen Voltage, Wheel Tachometer A, Wheel Tachometer B, Brake Pipe I, Brake Pipe 2, Brake Cylinder, Equalizing Reservoir, Atmospheric, DB Excitation, EOT Brake Pipe Pressure, EOTMoving, EOT Marker Status, EOTNoComm, GPS1 NMEA Messages, GPS2 NMEA Messages, CCS RST+, CCSADV APP+, CCS APP+, CCS CLR+, CCSC/O+, CCSPARC/O+, Horn Button, ER Forward, ER Reverse, ER Gen Field, ER Throttle A, ER Throttle B, ER Throttle C, ER Throttle D, ERDB Set UP, ER PCS, ER Manual Sand, ER Alerter Reset, Lead/Trail, Train Separation, Actuating Pipe, EIE, ER DB Excitation, ER Brake Pipe, ER Brake Cylinder, ER penalty MV, or any combination thereof.

The onboard vehicle hardware and subsystem components 106 may include the event recorder that records data indicative of the operator inputs, the control signals, and/or the output signals from the monitoring components (e.g., the PTC system). For example, the event recorder can store data indicative of the controls directed by the operator, the control signals that were generated by the PCL layer, and/or whether the PTC system generated output signals that prevented certain movements or changes in movement commanded by the operator inputs. The data stored in the event recorder can be reviewed or played back at a later time to examine and/or evaluate performance of the operator and/or operation of components of the vehicle system. For example, the same notifications or alarms generated by the PTC system may be repeated to allow the operator to try different emulated control of the vehicle system.

These outputs are a set of signals for a 26L vehicle equipped with the safety system and an event recorder and are publicly defined by Wabtec Corp. Some of these outputs are publicly defined by the AAR. For example the cab signal aspect outputs are a typical 4 aspect cab signal system. These controls signals are driven by the PLCs to emulate the vehicle environment to provide monitoring onboard vehicle hardware and subsystems the same signals as are expected during revenue operation of an actual vehicle. For example, vehicle acceleration and speed values based on a summation of forces applied by the emulation circuitry can provide a realistic emulated operation of the vehicle from a user selected starting point on a route. In another example, the at least one control signal comprises at least one of i) movement data representing at least one of the following: an emulated speed of the vehicle, an emulated acceleration of the vehicle, or any combination thereof and ii) location data representing at least one of the following: an emulated location or position of the vehicle, an emulated location or position of a vehicle system including the vehicle, an emulated location or position of at least one non-propulsion-generating vehicle of the vehicle system, or any combination thereof.

The emulation circuitry of the PLC layer 104 may be programmed or configured to determine or receive the output signals from the vehicle subsystem components layer 106. In one example, the PLC layer 104 is programmed or configured to receive data representing an event recorder file. For example, PLC layer 104 can receive a .dat file to playback an event recorded download file, which enables the emulation circuitry to recreate conditions and events that actually occurred in a vehicle during revenue service. In an example, the HMI 102 can disable the user input during the recreation so that the .dat file determines the vehicle control circuits that are generated by the emulation circuitry. In another example, the emulation circuitry in the PLC layer 104 can be programmed or configured to replicate conditions present in one or more vehicle control circuits of a vehicle at a selected period of time based on the data representing the event recorder file. For example, the conditions can include at least one error or failure condition of the one or more vehicle control circuits of the vehicle. In some examples, the emulation circuitry is programmed or configured to modify the emulation of the operations of the vehicle control circuits to simulate at least one failure of a vehicle control circuit. The emulation circuitry can inject faults into the output logic of the PLCs to in effect "break" the vehicle to simulate an onboard vehicle hardware or subsystem failure.

In another example, the PLC layer 104 is programmed or configured to receive data representing a route database file, e.g., a subdiv file. The emulation circuitry can be configured to generate the at least one control signal in a National Marine Electronics Association (NMEA) format based on the data representing the route database file. For example, a user can select a geographic location via the HMI 102 that causes the PLC layer 104 to output an associated latitude, longitude, heading, and speed in NMEA message formation to an onboard vehicle hardware and subsystem component in the layer 106.

Although disclosed and non-limiting embodiments or aspects are discussed mainly with respect to a LCSG 100 implemented with respect to a 26L Phase I version vehicle, disclosed and non-limiting embodiments or aspects are not limited thereto and the LCSG 100 can be implemented with respect to any type or version of vehicle, such as a vehicle equipped with Electronic Air Brakes where RS-422 (TIA/EIA-422 Standard via the Electronics Industries Alliance) is employed. A LCSG 100 in this configuration can have an RS-422 serial board that will transmit both ILC (Integrated Locomotive Control and EAB (Electronic Air Brake) serial data in accordance with AAR S-9101-E Locomotive System Integration (LSI) Communications.

The emulation circuitry of the PLC layer 104, for example, the PC 1 and the PLCs, can be programmed or configured to accommodate various vehicle control system types and air brake combinations that are used in the rail industry, which can each have unique signal type combinations that emulate various actual vehicles used by the railroads. In an example, the emulation circuitry of the PLC layer 104 is programmed or configured to emulate an operation of a vehicle control circuit of a vehicle equipped with 26L type air brake system and a DC traction type propulsion system. In another example, the emulation circuitry is programmed or configured to emulate an operation of a vehicle control circuit of a vehicle equipped with a Locomotive Systems Integration (LSI) protocol electronic air brake system and an AC traction type propulsion system. In still another example, the emulation circuitry is programmed or configured to emulate an operation of a vehicle control circuit of a vehicle equipped with a locomotive interface gateway (LIG). LIG is primarily an Ethernet messaging structure based on Edge Messaging Protocol (EMP) which takes the vehicle OEM proprietary control system protocol and translates it into the AAR S-9365 standard message structure. The LCSG 100 can maintain the various other signal types, such as digital, analog, frequency, and serial communications signals, as still used on the newer vehicle that it emulates for signal redundancy. For example, the LCSG 100 can emulate any of the functions or operations defined for a vehicle in the Association of American Railroads (AAR) Manual of Standards and Recommended Practices Office Architecture and Railroad Electronics Messaging Locomotive Interface Gateway (LIG) to Positive Train Control (PTC) Interface Control Document (ICD) Standard S-9365.V2.0, which is incorporated herein by reference in its entirety.

Figure 5:
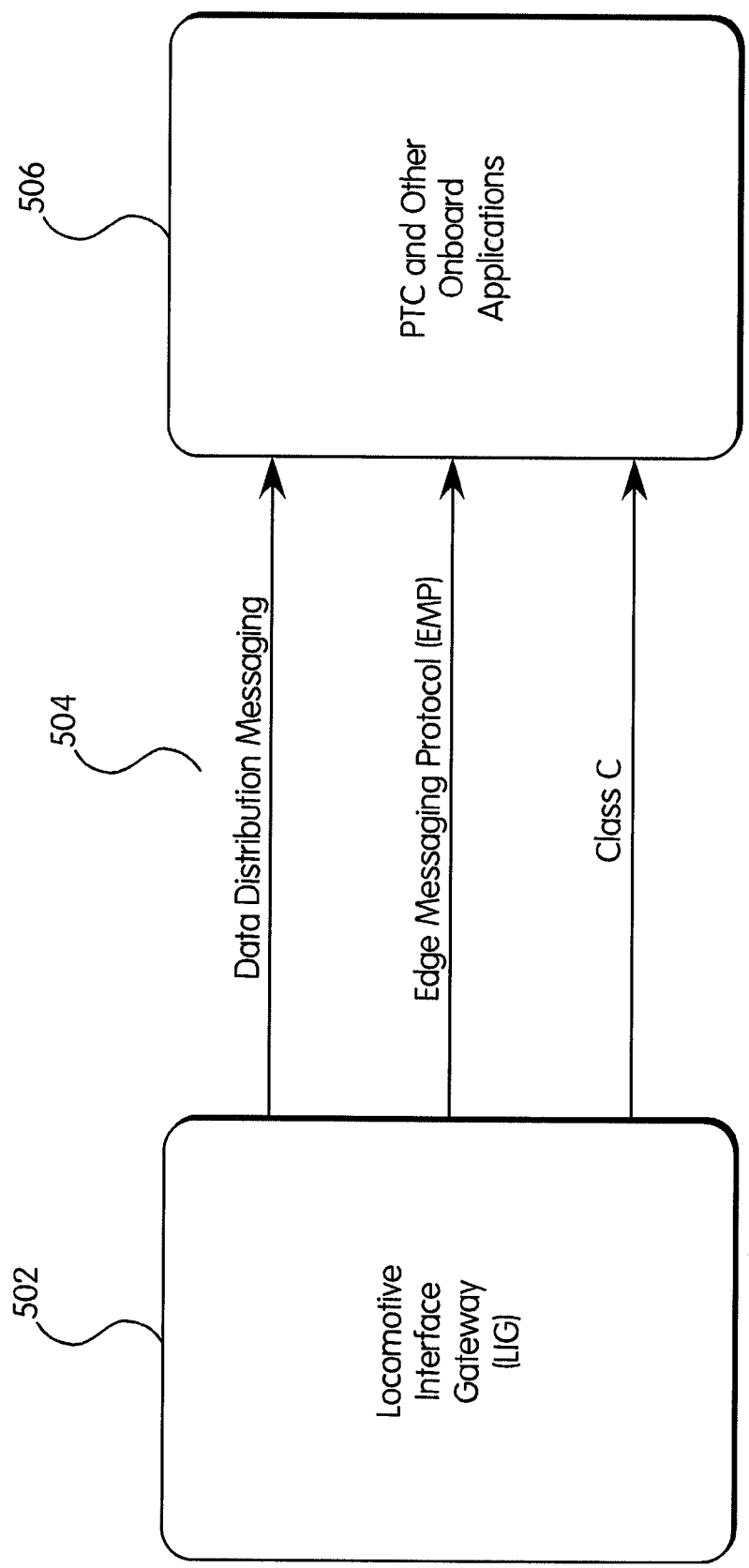
FIG. 5 is a schematic drawings of a Locomotive Interface Gateway (LIG) to Positive Train Control (PTC) application interface according to one embodiment.

Referring to FIG. 5, the LCSG 100 can emulate a LIG 502, which can be interfaced with an application of the safety system and/or other onboard vehicle applications or subsystems. For example, an interface 504 between the emulated LIG 502 and the safety system 506 can occur over the S-9101 vehicle LAN. The interface 504 between the emulated LIG 502 and the safety system 506 comprises several layered protocols. For example, messages may be in the edge message protocol (EMP) format, and the interface 504 may use Class C messaging for unidirectional data distribution from the LIG 502 to the safety system 506. FIG. 5 shows a Class C interface architecture for the emulated LIG 502 to PTC application 506 interface. An LIG version of the LCSG 100 can emulate LIG messaging to connected devices, such as I-ETMS, Recorders, etc. that subscribe to the Class C broadcast message. The LCSG 100, by emulating the LIG 502, can generate control signals in the EMP format using Class C messaging for controlling the PTC system 506 and/or other onboard applications and vehicle subsystems, such as, a propulsion system, a vehicle system line control system, an air brake system, a dynamic braking system, a HOT system, an EOT system, a 4-Aspect cab signaling system, an event recorder system, and the like.

An LCSG 100 can be used to train mechanical repair personnel so that they can more truly comprehend how onboard vehicle systems, such as safety and event recorder systems, behave in the field on both fully operational vehicles and on vehicles that are in a failed or problematic state. Hardware testing labs can benefit from the LCSG 100 to validate repairs or to diagnose hardware problems before applying to a vehicle for service.

Although the inventive subject matter has been described in detail for the purpose of illustration based on what is currently considered to be the most practical and preferred embodiments, it is to be understood that such detail is solely for that purpose and that the inventive subject matter is not limited to the disclosed embodiments, but, on the contrary, is intended to cover modifications and equivalent arrangements that are within the spirit and scope of the appended claims. For example, it is to be understood that the present inventive subject matter contemplates that, to the extent possible, one or more features of any embodiment can be combined with one or more features of any other embodiment.

For purposes of the description hereinafter, the terms "upper", "lower", "right", "left", "vertical", "horizontal", "top", "bottom", "lateral", "longitudinal" and derivatives thereof shall relate to the inventive subject matter as it is oriented in the drawing figures. It is to be understood that the inventive subject matter may assume various alternative variations and step sequences, except where expressly specified to the contrary. It is also to be understood that the specific devices and processes illustrated in the attached drawings, and described in the following specification, are simply exemplary embodiments of the inventive subject matter. Hence, specific dimensions and other physical characteristics related to the embodiments disclosed herein are not to be considered as limiting.

As used herein, the terms "communication" and "communicate" refer to the receipt, transmission, or transfer of one or more signals, messages, commands, or other type of data. For one unit or device to be in communication with another unit or device means that the one unit or device is able to receive data from and/or transmit data to the other unit or device. A communication may use a direct or indirect connection, and may be wired and/or wireless in nature. Additionally, two units or devices may be in communication with each other even though the data transmitted may be modified, processed, routed, etc., between the first and second unit or device. For example, a first unit may be in communication with a second unit even though the first unit passively receives data, and does not actively transmit data to the second unit. As another example, a first unit may be in communication with a second unit if an intermediary unit processes data from one unit and transmits processed data to the second unit. It will be appreciated that numerous other arrangements are possible. Any known electronic communication protocols and/or algorithms may be used such as, for example, TCP/IP (including HTTP and other protocols), WLAN (including 802.11 and other radio frequency-based protocols and methods), analog transmissions, and/or the like. It is to be noted that a "communication device" includes any device that facilitates communication (whether wirelessly or hard-wired (e.g., over the rails of a route)) between two units, such as two vehicle units or control cars. In one preferred and non-limiting embodiment or aspect, the "communication device" is a radio transceiver programmed, configured, or adapted to wirelessly transmit and receive radio frequency signals and data over a radio signal communication path.

The inventive subject matter, including the various computer-implemented and/or computer-designed aspects and configures, may be implemented on a variety of computing devices and systems, wherein these computing devices include the appropriate processing mechanisms and computer-readable media for storing and executing computer-readable instructions, such as programming instructions, code, and the like. In addition, aspects of this inventive subject matter may be implemented on existing controllers, control systems, and computers integrated or associated with, or positioned on, a vehicle or control car and/or any of the non-propulsion-generating vehicles. For example, the presently-invented system or any of its functional components can be implemented wholly or partially on a vehicle system management computer, a Positive Train Control computer, an on-board controller or computer, a non-propulsion-generating vehicle computer, and the like. In addition, the presently-invented systems and methods may be implemented in a laboratory environment in one or more computers or servers. Still further, the functions and computer-implemented features of the inventive subject matter may be in the form of software, firmware, hardware, programmed control systems, microprocessors, and the like.

The vehicle control signal generator and computer-implemented method described and claimed herein may be implemented in connection with a variety of systems and vehicular networks; however, the systems and methods described herein are particularly useful in connection with a railway system and network. Accordingly, the presently-invented methods and systems can be implemented in connection with various known vehicle system control and management systems, e.g., the I-ETMS® of Wabtec Corp. The systems and methods described herein are useful in connection with emulating the operations of one or more vehicles or control cars that make up a vehicle system. It should be noted that multiple vehicles or control cars may be included in the emulated vehicle system to facilitate the reduction of the vehicle system to match with passenger (or some other) demand or requirement. Further, the method and systems described herein can be used in connection with commuter vehicle systems, freight vehicle systems, push-pull vehicle system configurations, and/or other vehicle system arrangements and systems. Still further, the emulated vehicle system operations may be separated into different configurations (e.g., other vehicle systems) and movement emulated in either the first direction A and/or the second direction B. Any configuration or arrangement of vehicles, control cars, and/or non-propulsion-generating vehicles may be designated as a vehicle system and/or a consist. Still further, it is to be expressly understood that the presently-invented methods and systems described herein may be used in connection with an auxiliary vehicle, such as an auxiliary railroad vehicle, a maintenance vehicle or machine, a road vehicle (e.g., truck, pick-up truck, car, or other machine), a vehicle equipped to ride on the rails of the route, and/or the like.

In one preferred and non-limiting embodiment or aspect, the methods and systems described herein are used in connection with the vehicles or controls cars that are positioned on each end of the vehicle system, while in other preferred and non-limiting embodiments, the methods and systems described herein are used in connection with vehicles or control cars that are positioned intermediately in the vehicle system (since these intermediate vehicles or control cars may eventually become a controlling vehicle or control car when the vehicle system is reconfigured). It is also noted that the methods and systems described herein may be used in connection with "electrical multiple unit" (EMU) or "diesel multiple unit" (DMU) configurations, where a vehicle does not technically exist, but multiple control cars would still be present. Still further, the emulated vehicle system may include only one vehicle or control car and/or some or no non-propulsion-generating vehicles. Also, as discussed above, the methods and systems described herein may be used in connection with any vehicle type operating in the railway network.

Although the inventive subject matter has been described in detail for the purpose of illustration based on what is currently considered to be the most practical and preferred embodiments, it is to be understood that such detail is solely for that purpose and that the inventive subject matter is not limited to the disclosed embodiments, but, on the contrary, is intended to cover modifications and equivalent arrangements that are within the spirit and scope of the appended claims. For example, it is to be understood that the inventive subject matter contemplates that, to the extent possible, one or more features of any embodiment can be combined with one or more features of any other embodiment.

What is claimed is:

1. A vehicle control signal generator comprising:
emulation circuitry configured to receive operator input for a vehicle system and to emulate control of the vehicle system based on the operator input, the emulation circuitry configured to generate a control signal configured to control one or more of a propulsion system of the vehicle system to propel the vehicle system or a braking system of the vehicle system to slow or stop movement of the vehicle system, the emulation circuitry configured to output the control signal based on the operator input without sending the control signal to the one or more of the propulsion system or the braking system to change operation of the one or more of the propulsion system or the braking system; and
a positive vehicle control (PVC) system configured to be disposed onboard the vehicle system and to determine operation of the one or more of the propulsion system or the braking system as directed by the control signal that is output by the emulation circuitry, the PVC system configured to generate an output signal to notify the operator whether the operation of the one or more of the propulsion system or the braking system is permissible.

2. The vehicle control signal generator of claim 1, wherein the emulation circuitry is configured to output the control signal during emulated control of the vehicle system while the vehicle system remains stationary to be identical to another control signal that is generated during actual control of the vehicle system while the vehicle system is moving.

3. The vehicle control signal generator of claim 1, wherein the PVC system is configured to determine whether the control signal directs the vehicle system to continue moving toward an upcoming segment of the route while the vehicle system is not allowed to enter into the upcoming segment of the route.

4. The vehicle control signal generator of claim 1, wherein the PVC system is configured to determine whether the control signal directs the vehicle system to continue moving faster than a speed limit.

5. The vehicle control signal generator of claim 1, wherein the PVC system is configured to direct a display to present a notification to the operator indicating that the operator input is not permitted.

6. The vehicle control signal generator of claim 1, further comprising:
an event recorder configured to store data indicative of the control signal from the emulation circuitry and the output signal from the monitoring component.

7. The vehicle control signal generator of claim 6, wherein the event recorder is configured to repeat one or more of the control signal or the output signal during playback of the data stored in the event recorder to repeat emulated control of the vehicle system.

8. A vehicle control signal generator comprising:
emulation circuitry configured to receive operator input for a vehicle system and to emulate control of the vehicle system based on the operator input, the emulation circuitry configured to generate a control signal configured to control one or more of a propulsion system of the vehicle system to propel the vehicle system or a braking system of the vehicle system to slow or stop movement of the vehicle system, the emulation circuitry configured to output the control signal based on the operator input without sending the control signal to the one or more of the propulsion system or the braking system to change operation of the one or more of the propulsion system or the braking system; and
a monitoring component configured to be disposed onboard the vehicle system and to determine operation of the one or more of the propulsion system or the braking system as directed by the control signal that is output by the emulation circuitry, the monitoring component configured to generate an output signal to notify the operator whether the operation of the one or more of the propulsion system or the braking system is permissible.

9. The vehicle control signal generator of claim 8, wherein the emulation circuitry is configured to output the control signal during emulated control of the vehicle system while the vehicle system remains stationary to be identical to another control signal that is generated during actual control of the vehicle system while the vehicle system is moving.

10. The vehicle control signal generator of claim 8, wherein the monitoring component includes a positive vehicle control (PVC) system.

11. The vehicle control signal generator of claim 10, wherein the PVC system is configured to determine whether the control signal directs the vehicle system to continue moving toward an upcoming segment of the route while the vehicle system is not allowed to enter into the upcoming segment of the route.

12. The vehicle control signal generator of claim 10, wherein the PVC system is configured to determine whether the control signal directs the vehicle system to continue moving faster than a speed limit.

13. The vehicle control signal generator of claim 10, wherein the PVC system is configured to direct a display to present a notification to the operator indicating that the operator input is not permitted.

14. The vehicle control signal generator of claim 8, further comprising:
an event recorder configured to store data indicative of the control signal from the emulation circuitry and the output signal from the monitoring component.

15. The vehicle control signal generator of claim 14, wherein the event recorder is configured to repeat one or more of the control signal or the output signal during playback of the data stored in the event recorder to repeat emulated control of the vehicle system.

16. A rail vehicle control signal generator comprising:
emulation circuitry configured to receive operator input for a rail vehicle system and to emulate control of the rail vehicle system based on the operator input, the emulation circuitry configured to generate a control signal configured to control one or more of a propulsion system or a braking system of the rail vehicle system, the emulation circuitry configured to output the control signal based on the operator input without sending the control signal to the one or more of the propulsion system or the braking system to change operation of the one or more of the propulsion system or the braking system, the control signal configured to actually control operation of the one or more of the propulsion system or the braking system; and
a positive train control (PTC) system configured to be disposed onboard the vehicle system and to determine operation of the one or more of the propulsion system or the braking system as directed by the control signal that is output by the emulation circuitry, the PTC system configured to generate an output signal to notify the operator whether the operation of the one or more of the propulsion system or the braking system is permissible.

17. The rail vehicle control signal generator of claim 16, wherein the PTC system is configured to determine whether the control signal directs the vehicle system to continue moving toward an upcoming segment of the route while the vehicle system is not allowed to enter into the upcoming segment of the route.

18. The rail vehicle control signal generator of claim 16, wherein the PTC system is configured to determine whether the control signal directs the rail vehicle system to continue moving faster than a speed limit.

19. The rail vehicle control signal generator of claim 16, further comprising:
   an event recorder configured to store data indicative of the control signal from the emulation circuitry and the output signal from the monitoring component.

20. The rail vehicle control signal generator of claim 19, wherein the event recorder is configured to repeat one or more of the control signal or the output signal during playback of the data stored in the event recorder to repeat emulated control of the rail vehicle system.

* * * * *